(12) United States Patent
Kita

(10) Patent No.: US 6,338,558 B1
(45) Date of Patent: Jan. 15, 2002

(54) SPECTACLE LENSES AND A PAIR OF SPECTACLES USING THE SAME

(75) Inventor: Tadashi Kita, Higashi-Osaka (JP)

(73) Assignee: Yamamoto Kogaku Co., Ltd., Higashi-Osaka (JP)

( * ) Notice: Subject to any disclaimer, the term of this patent is extended or adjusted under 35 U.S.C. 154(b) by 0 days.

(21) Appl. No.: 09/466,931

(22) Filed: Dec. 20, 1999

(30) Foreign Application Priority Data

Dec. 24, 1998 (JP) .............................. 10-367584

(51) Int. Cl.$^7$ .................................. G02C 7/02
(52) U.S. Cl. .................... 351/159; 351/49; 351/163
(58) Field of Search .................. 351/159, 163, 351/165, 174, 158, 41, 44, 49

(56) References Cited

U.S. PATENT DOCUMENTS

| | | | |
|---|---|---|---|
| 4,310,225 A | 1/1982 | Davis | 351/176 |
| 5,648,832 A | 7/1997 | Houston et al. | 351/159 |
| 5,689,323 A | 11/1997 | Houston et al. | 351/41 |
| 5,805,263 A | 9/1998 | Reymondet et al. | 351/159 |
| 6,129,435 A * | 10/2000 | Reichow et al. | 351/41 |
| 6,142,624 A * | 11/2000 | Morris et al. | 351/159 |
| 6,180,033 B1 * | 1/2001 | Greshes | 264/1.32 |

FOREIGN PATENT DOCUMENTS

| | | |
|---|---|---|
| WO | WO 97/35224 | 9/1997 |
| WO | WO 99/52480 | 10/1999 |

* cited by examiner

*Primary Examiner*—Jordan M. Schwartz
(74) *Attorney, Agent, or Firm*—Oblon, Spivak, McClelland, Maier & Neustadt, P.C.

(57) ABSTRACT

Uncut spectacle lenses and a pair of spectacles using such lenses are provided. The uncut lenses includes a lens body and a pair of tabs fixed to an outer periphery of the lens body in opposite relationship with each other with respect to the geometrical center of the lens. The optical center of the lens is set up at a position spaced apart from the geometrical center thereof such that a line connecting the geometrical center and the optical center of the lens makes a predetermined angle with respect to a central line passing through the pair of tabs and the geometrical center of the lens. Further, the invention provides a polarizing spectacle lens wherein the optical center of the lens is located at a position spaced apart from the geometrical center and the line connecting the geometrical center and the optical center makes a predetermined angle with respect to the axis of polarization of the lens.

22 Claims, 5 Drawing Sheets

SPECTACLE LENSES AND A PAIR OF SPECTACLES USING THE SAME

BACKGROUND OF THE INVENTION

1. Field of the Invention

The present invention relates to spectacle lenses and a pair of spectacles using the same.

A pair of spectacles using highly-curved lenses represented by the 8-base curve are effective for improving the field of view, minimizing the space between the spectacle frame and the face of the user and the entry of wind and light into the space between the spectacles and the face of the user.

2. Description of Prior Art

The conventional spectacle lenses of the above-described kind are generally formed in such a manner that the geometrical center of each of the lenses coincides with the optical center thereof.

However, as shown in FIG. 5, a pair of spectacles using highly-curved lenses extending along the face of the user have the disadvantage that since the lenses incline forward as they respectively extend along the face of the user from the outer ends toward the inner ends thereof in the horizontal direction, unless the optical center of each of the lenses is set at a position near the nose N of the user rather than at a position E of each of the pupils of the eyes of the user, the degree of parallelism becomes too large for the user to see the things well. Further, when such highly-curved lens is attempted to extend along the face of the user, the lens usually inclines forward by 10 through 15 degrees. In this case, the mere setting of the optical center of the lens on the side of the nose N of the user rather than on the side of the user's pupil position E results in making the degree of parallelism in the vertical direction too large for the user to see things well.

SUMMARY OF THE INVENTION

The present invention has been made in view of the above-described problems and an object of the invention is to provide spectacle lenses and a pair of spectacles making use of such spectacle lenses each of which have a reduced degree of parallelism as one of the optical performances thereof, so that when the pair of spectacles are worn by a user with the lenses kept extending along the face of the user, the user can clearly see the things in front of him.

According to a technical means provided by the present invention for solving the above-described problems is that a pair of tabs are fixed to the outer periphery of each of main bodies of uncut spectacle lenses in opposite relationship with each other, each of the main bodies has an optical center (b) at a position spaced apart from the geometrical center (a) thereof and a line (c) which connects the geometrical center (a) and the optical center (b) makes a predetermined angle with respect to a central line (d) which passes through the pair of tabs and the geometrical center (a) of the lens body.

Accordingly, when each of the uncut spectacle lenses is cut to the shape of the spectacle frame corresponding thereto, the pair of tabs can be used to serve as a means (or a jig) for positioning the optical center (b) of each of the lenses at a predetermined position of the lens and by making use of such tabs, it is possible to cut each of the uncut spectacle lenses easily and accurately. Further, it is possible to manufacture a pair of spectacles by making use of such uncut spectacle lenses in such a manner that when the user wears the pair of spectacles, the optical center (b) of each of the spectacle lenses come to lie inside and above the geometrical center (a) thereof in the horizontal direction and further, when the user causes the spectacle lenses to extend along his face, the degree of parallelism as one of the optical performances of the lens can be made small thereby allowing the user to clearly see things in front of him.

Another technical means according to the present invention is that the connecting line (c) makes a predetermined angle, that is about 20 degrees, with respect to a central line (d).

Accordingly, when the pair of spectacles are worn by a user with the lenses kept extending along the face of the user, the degree of parallelism of the lenses in the vertical direction can be made as small as possible for the user to see the things in front of him further well.

According to another technical means provided by the present invention for solving the above-described problems is that in the case of a polarizing uncut spectacle lens, the lens has an optical center (b) at a position spaced apart from the geometrical center (a) of the lens, and the distance between the geometrical center (a) and a parallel line (e) drawn parallel to the axis of polarization from the optical center (b) of the lens is in the order of 8.21 mm ±5 mm.

Accordingly, when the user wears the pair of spectacles in such a manner that the spectacle lenses extend along the face of the user, the degree of parallelism of the lens in the vertical direction and that of the lens in the horizontal direction can be made as small as possible so that the user can see more clearly things in front of him.

A further technical means provided by the present invention is that the optical center (b) of the above-described lens lies at a position spaced apart from the geometrical center (a) of the lens by 19 mm through 29 mm.

Accordingly, when the user wears his pair of spectacles in such a manner that the spectacle lenses extend along his face, the degree of parallelism in the horizontal direction can be made as small as possible thereby allowing the user to see more clearly things in front of him.

A still further technical means provided by the present invention is that at least a pair of tabs are fixed to the outer periphery of the main body of each of the spectacle lenses in spaced relationship with each other so that when a plurality of such lenses are laid one above another, the tabs support the outer periphery of one of the adjoining lens thereby preventing the adjoining lenses from coming into contact with each other and preventing the surface of each of the lenses from getting scratched.

A still further technical means provided by the present invention is that the pair of tabs project from the outer periphery of the main body of each of the uncut spectacle lenses by 2 mm or more both in length and width.

Accordingly, when the pair of tabs are used as a means for positioning the optical center (b) of the lens at a predetermined position of the lens, the positioning operation can be performed more accurately at the time of cutting and it is possible to cut the uncut spectacle lens more simply and more accurately.

A still further technical means provided by the present invention is that that a line connecting the centers of at least a pair of tabs passes through the geometrical center (a) of the lens.

Accordingly, the pair of tabs can be effectively made use of as a means for positioning the optical center (b) at a predetermined position on the lens.

A still further technical means provided by the present invention is that the optical center (b) of each of the spectacle lens lies at a position spaced apart from the geometrical center (a) thereof so that when a user wears a pair of spectacles using such lenses, the optical center (b) of each of the lenses lies at a position displaced inward and upward from the geometrical center (a) of the lens in the horizontal direction.

Accordingly, when a pair of spectacles making use of such lenses is manufactured, it is possible to constitute each of the spectacle lenses in such a manner that the optical center (b) of the lens lies at a position displaced inward and upward from the geometrical center (a) thereof so that when a user wears the pair of spectacles along his face, the degree of parallelism of the lens which is one of the performances of the lens can be made small thereby allowing the user to clearly see things in front of him.

A still further technical means provided by the present invention is that in the case of a polarizing spectacle lens, the optical center (b) of the lens is at a position spaced apart from the geometrical center (a), and a line (c) connecting the optical center (b) and the geometrical center (a) makes a predetermined angle with respect to the axis of polarization of the lens.

Accordingly, when a user wears a pair of spectacles using such lenses, the axis of polarization of each of the spectacle lenses is directed toward the horizontal direction and also when the pair of spectacles are held extending along the face of the user, the degree of parallelism of the lens becomes favorable so that the user can clearly see things in front of him.

A still further technical means provided by the present invention is the above-described spectacle lens has a lens curve having six or more bases.

A still further technical means provided by the present invention resides with a pair of spectacles making use of the above-described spectacle lenses.

DESCRIPTION OF PREFERRED EMBODIMENTS

One embodiment of the present invention will be described with reference to the accompanying drawings.

Figure 1:
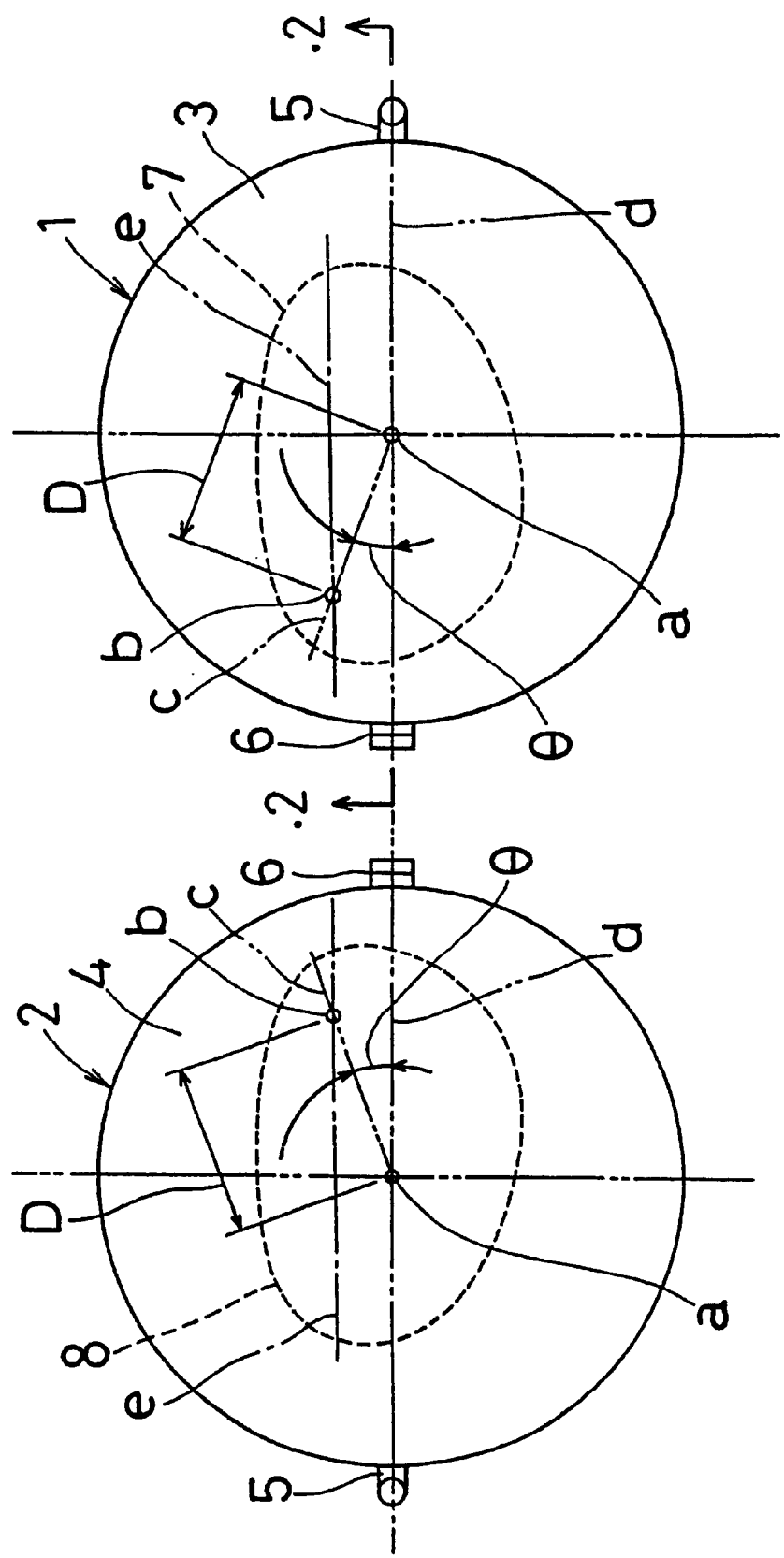
FIG. 1 is a front view of an uncut spectacle lens illustrating a mode of carrying out the present invention.
Figure 2:
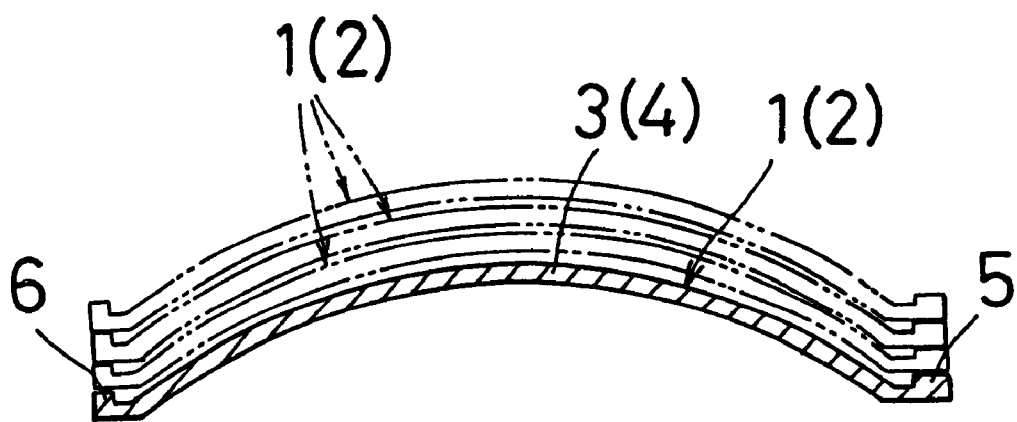
FIG. 2 is a sectional view taken along the A—A line of FIG. 1.

In FIG. 1, reference numeral 1 designates an uncut highly-curved spectacle lens for the left-side eye of a user and reference numeral 2 designates an uncut highly-curved spectacle lens for the right-side eye of the user. These lenses 1 and 2 are formed of a transparent glass or synthetic resin material. These uncut spectacle lenses 1 and 2 comprise circular lens bodies 3 and 4 and pairs of tabs 5 and 6 provided in the outer periphery of each of the lens bodies 3 and 4, respectively, and each of the lenses is made highly curved (for example, eight (8) base curve) as shown in FIG. 2 so as to improve the visual field of the user and to minimize the space between the spectacle frames and the face of the user and so as to prevent the admission of the wind and the light into the space.

Further, it should be noted that although the curvature of each of the spectacle lens 1 and 2 is desired to be of 8 bases, it is not always limited thereto but it may be of any other bases more than 6 bases for the purpose of minimizing the space between the spectacle frames and the face of the user and preventing the admission of the wind into the space.

The tabs 5 and 6 of each of the uncut spectacle lenses 1 and 2 are so provided as to lie opposite to each other with respect to the geometrical center (a) of the lens. Further, each of the lenses has an optical center (b) at a position spaced apart from the geometrical center (a) thereof such that a line connecting the centers of the pair of tabs 5 and 6 passes the geometrical center (a) of the lens and a line (c) connecting the geometrical center (a) and the optical center (b) of the lens makes a predetermined angle Θ with respect to a central line (d) passing through the pair of tabs 5 and 6 and the geometrical center (a) of the lens.

Figure 4:
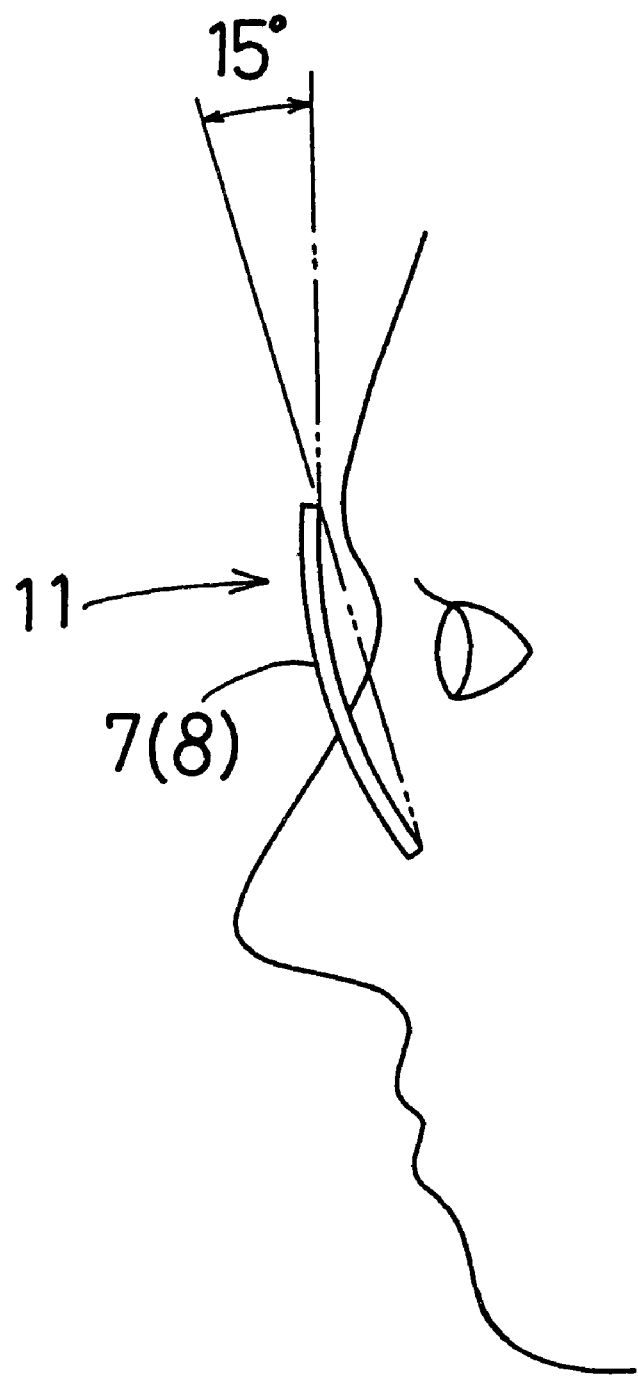
FIG. 4 is a side view of the pair of spectacles of FIG. 3 when they are worn by a user.

That is, to describe more concretely, when the highly-curved spectacle lenses are tried to extend along the face of the user, the lenses become so inclined as to project forward as they extend from the horizontal outer ends toward the horizontal inner ends thereof, respectively, along the face of the user so that unless the optical center (b) is set up on the side of the nose N of the user rather than at the position E of the pupil of each of the eyes of the user, the degree of parallelism of the lens becomes too large for the user to see things well. Further, as shown in FIG. 4, it is common for a spectacle lens to incline forward by 10 through 15 degrees. In this case also, the mere displacement of the optical center (b) of the spectacle lens from the position E of the pupil of the eye of the user toward his nose N makes the degree of parallelism too large in the vertical direction. As a means for solving this problem, the optical center (b) of the spectacle lens is separated from the geometrical center b(a) of the lens by 19 mm through 29 mm, or preferably by 24 mm and the connecting line (c) is displaced upward by 20°±10° or preferably by 20° with respect to the central line (d). That is, the above-described predetermined angle is set upward by 20°±10° or preferably by 20° with respect to the central line (d) and the distance D between the optical center (b) and the geometrical center (a) is set to be in the order of 19 mm through 29 mm or preferably 24 mm.

Figure 6:
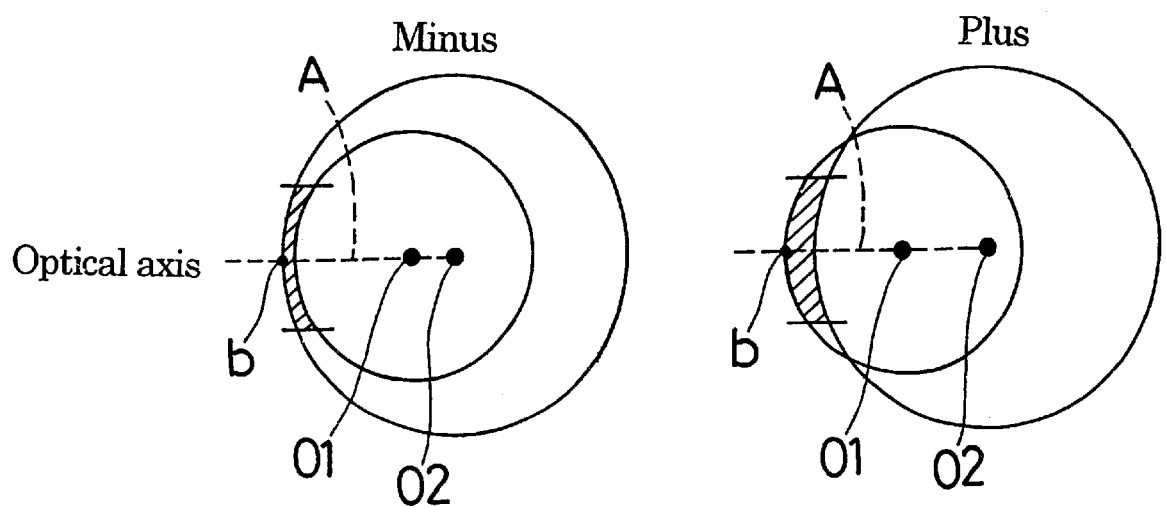
FIG. 6 is a view given for illustrating the optical center of a lens.

In the above case, the optical center (b) is the point through which the optical axis of the lens passes and the optical axis is a line of extension connecting the centers of the two spherical bodies. That is, as shown in FIG. 6, a straight line connecting the centers 01 and 02 of two circles formed by a lens is the optical axis A and the position on the lens through which the optical axis A passes is the optical center (b). Further, the geometrical center (a) is the center of the lens when considered from the geometrical point of view such that when the lens is circular, the center of the circular lens is the geometrical center (a) of the lens. Further, in the case of a flat lens, it is generally observed that the curvature of the concave surface and that of the convex surface of the lens are parallel to each other in section but when both of the surfaces are parallel to each other, a spherical aberration takes place more easily as the lens base curve becomes deeper so that it is necessary to design the lens base curve so as to correct the spherical aberration and both the concave and convex surfaces do not become parallel to each other. Accordingly, even a flat lens has the centers 01 and 02 of two spherical bodies thereof.

Further, each of the uncut spectacle lenses 1 and 2 generates polarized light for suppressing the dizziness and glitter and is formed 0 that the central line (d) and the axis of polarization of the lens run parallel to each other and that the distance between the central line (d) and the parallel line (e) drawn parallel to the axis of polarization of the lens from the optical center (b) thereof is set to 8.21 mm ±5 mm.

The tabs 5 and 6 of each of the uncut spectacle lenses 1 and 2 project toward the convex surface of the lens in the direction of thickness thereof and the length and width of each of the tabs 5 and 6 projecting from the outer periphery of the lens are each 2 mm or more and both of the tabs have the same thickness so that when a plurality of such uncut spectacle lenses 1 an 2 are laid one above another as shown by the chain line in FIG. 2, the lens bodies 3 and 4 of the vertically adjoining uncut spectacle lenses 1 and 2 do not come into contact with each other with the tabs 5 and 6 of one pair of the uncut spectacle lenses 1 and 2 adjoining vertically each other supporting the outer periphery of each of the lens bodies 3 and 4 of the other pair of uncut spectacle lenses 1 and 2.

Figure 3:
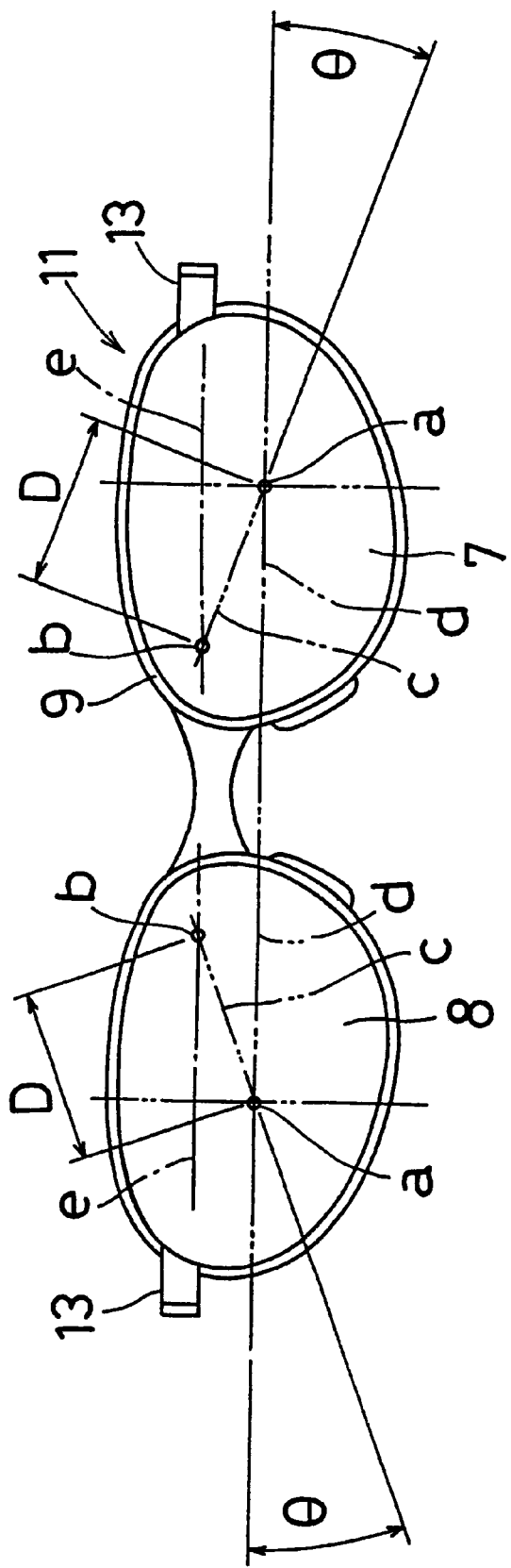
FIG. 3 is a front view of a pair of spectacles.

In FIGS. 1 and 3, reference numeral 7 designates a spectacle lens for the left-side eye of a user and reference numeral 8 designates a spectacle lens for the right-side eye of the user. As shown by the dotted lines in FIG. 1, these spectacle lenses 7 and 8 are obtained as a result of cutting the uncut spectacle lenses 1 and 2 without changing the geometrical center (a) of each of them (that is, the geometrical center (a) of each of the uncut spectacle lenses 1 and 2 and the geometrical center (a) of each of the spectacle lenses 7 and 8 coincide with each other in position) so as to correspond to spectacle frames 9 in FIG. 3. Accordingly, the geometrical center (a) of each of the spectacle lenses 7 and 8 coincides in position with the optical center (b) of each of the uncut spectacle lenses 7 and 8 and the optical center (b) of each of the spectacle lenses 7 and 8 coincides in position with the optical center (b) of each of the uncut spectacle lenses 1 and 2 since the optical center (b) of each of the spectacle lenses 7 and 8 does not change irrespective of the cut shape of each of the lenses.

Figure 5:
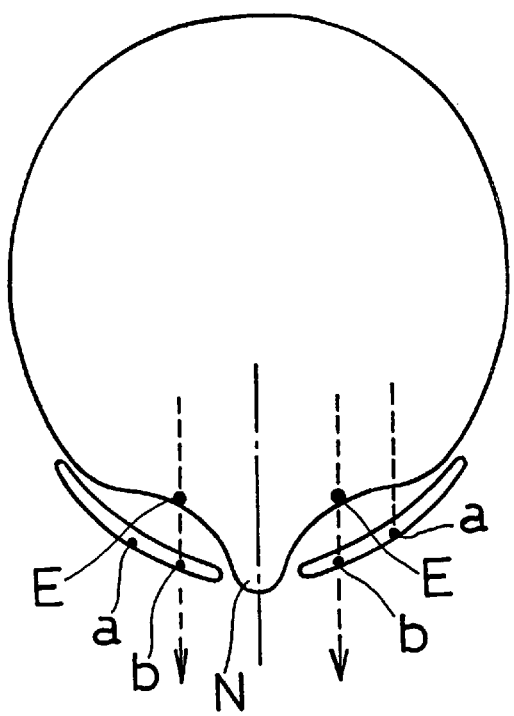
FIG. 5 is a plan view of the same.

Further, when a pair of spectacles 11 making use of the uncut spectacle lenses 1 and 2 or the spectacle lenses 7 and 8 are produced by fitting the cut spectacle lenses 7 and 8 in the spectacle frames 9 and the user wears the pair of spectacles 11, the spectacle lenses 7 and 8 incline forward by 10 through 15° as shown in FIG. 4 and at the same time, the cut spectacle lenses 7 and 8 incline forward as they extend from the outer ends toward the inner ends thereof in the horizontal direction along the face of the user as shown in FIG. 5 so that the geometrical center (a) of each of the spectacle lenses 7 and 8 corresponds in position to the pupil E of the eye of the user. Further, in this case, the optical center (b) of each of the lenses 7 and 8 comes to lie inside, and is displaced above, the geometrical center (a) thereof in the horizontal direction.

It should be noted that in FIG. 3, reference numeral 13 designates a hinge for mounting a temple.

According to the instant embodiment, when the user wears the pair of spectacles 11, since the spectacle lenses 7 and 8 are highly-curved lenses, they closely extend along the face of the user as shown in FIG. 4 so that it is possible to improve the field of view of the user and to minimize the admission the of wind and the light into the space between the pair of spectacles 11 and the face of the user.

However, as shown in FIG. 5, since the spectacle lenses 7 and 8 incline forward as they extend from the outer ends toward the inner ends thereof, respectively, in the horizontal direction along the face of the user, if the optical center (b) of each of the lenses lies at the position of the geometrical center (a) of each of them, the degree of parallelism of each of the lenses becomes large in the horizontal direction so that the user feels it difficult to clearly see the things in front of him, but in the case of the instant embodiment, the optical center (b) of each of the spectacle lenses 7 and 8 is displaced toward the nose N of the user with respect to the position (the geometrical center (a)) corresponding to the position E of the pupil of the eye of the user so that the degree of parallelism of each of the lenses 7 and 8 in the horizontal direction does not become large thereby allowing the user to clearly the see things in front of him.

Further, since it is usual that when the spectacle lenses 7 and 8 are caused to extend along the face of the user, they incline forward by 10° through 15° as shown in FIG. 4 so that by mere displacement of the optical center (b) toward the user's nose N with respect to the position of the pupil of the eye of the user (the geometrical center (a)), the degree of parallelism of each of the lenses in the vertical direction becomes too large for the user to clearly see the things in front of him, but in the instant embodiment, the optical center (b) of each of the spectacle lenses 7 and 8 is displaced upward from the geometrical center (a) thereof by 20°±10° or preferably by 20° so that the degree of parallelism of each lens in the vertical direction does not become large thereby allowing the user to clearly see the things in front of him.

Further, each of the polarizing spectacle lenses 7 and 8 is so formed that when the pair of spectacles 11 is worn by the user, not only the axis of polarization of each of the lenses 7 and 8 is directed toward the horizontal direction but also the central line (d) and the axis of polarization run parallel to each other and when the distance D between the optical center (b) and the geometrical center (a) is set to 19 mm through 29 mm or preferably to 24 mm and the line (c) connecting the geometrical center (a) and the optical center (b) of each of the lenses is displaced upward with respect to the axis of polarization by 20°±10° or preferably by 20°, the degree of parallelism as one of the optical performances of each of the lenses becomes favorable since the distance between the central line (d) and the line (e) drawn parallel to the axis of polarization of the lens from the optical center (b) of the lens is set to 8.21 mm ±5 mm, the user can clearly see the things in front of him also with the polarizing spectacle lenses 7 and 8.

Further, each of the uncut spectacle lenses 1 and 2 are provided on the outer periphery thereof with the pair of tabs 5 and 6 which are held in opposite relationship with each other with respect to the geometrical center (a) of the lens and each of the tabs 5 and 6 projects from the outer periphery of the lens by 2 mm or more both in length and width with the line connecting the centers of the tabs 5 and 6 passing through the geometrical center (a) of each of the lenses 1 and 2. Therefore, where the uncut lenses 1 and 2 are cut to the shapes of the spectacle frames 9, the tabs 5 and 6 can be used as means for positioning the optical center (b) of each of the lenses at a predetermined position on the pair of spectacles. Thus, by using the tabs 5 and 6, the uncut lenses 1 and 2 can be positioned and cut simply and accurately.

In other words, although it is possible to display the position of the central line (d) or the optical center(b) of each of the lenses 1 and 2 by drawing a marking line or dotted line on the outer periphery of the lens, it is more preferable for automatic positioning of the lens at the time of cutting to provide tabs of 2 mm or more both in length and width.

Still further, when the uncut lenses 1 and 2 are laid one above the other, the surfaces of the adjoining lenses are prevented from coming into contact with each other due to the thickness of each of the tabs 5 and 6 thereby preventing the lens surfaces from getting scratched. Further, since the pair of tabs 5 and 6 have the same thickness, even when a number of uncut spectacle lenses 1 and 2 are laid one above another in a magazine at the time of lens cutting, there arises no such inconvenience that lamination the lens 1 and 2 of inclines toward one side or the laminated lenses 1 and 2 get rattled.

It should be noted that in the instant embodiment, each of the uncut lenses 1 and 2 is provided with only the pair of tabs 5 and 6 on the outer periphery thereof, but other tabs may be provided in addition to these tabs 5 and 6.

Lastly, when a pair of spectacles using the spectacle lenses according to the present invention is worn by a user in such a manner that the spectacle lenses extend along the face of the user, the degree of parallelism as one of the performances of each of the lenses can be made small so that the user is allowed to clearly see the things in front of him.

What is claimed is:

1. An uncut spectacle lens comprising:
   a lens body; and
   a pair of tabs fixed to an outer periphery of the lens body in opposite relationship with each other with respect to a geometrical center of the lens,
   wherein the lens has an optical center at a position spaced apart from the geometrical center of the lens, and
   wherein a connecting line connecting the geometrical center and the optical center of the lens makes a predetermined angle in a range from about 10° to about 30° with respect to a central line passing through the pair of tabs and the geometrical center of the lens.

2. An uncut spectacle lens comprising:
   a lens body; and
   a pair of tabs fixed to an outer periphery of the lens body in opposite relationship with each other with respect to a geometrical center of the lens,
   wherein the lens has an optical center at a position spaced apart from the geometrical center of the lens,
   wherein a connecting line connecting the geometrical center and the optical center of the lens makes a predetermined angle with respect to a central line passing through the pair of tabs and the geometrical center of the lens, and
   wherein the predetermined angle made by said connecting line with respect to the central line is about 20 degrees.

3. An uncut spectacle lens comprising:
   a lens body; and
   a pair of tabs fixed to an outer periphery of the lens body in opposite relationship with each other with respect to a geometrical center of the lens,
   wherein the lens has an optical center at a position spaced apart from the geometrical center of the lens,
   wherein a connecting line connecting the geometrical center and the optical center of the lens makes a predetermined angle with respect to a central line passing through the pair of tabs and the geometrical center of the lens, and
   wherein the optical center of said uncut spectacle lens is spaced apart from the grometrical center of said uncut spectacle lens by 19 mm through 29 mm.

4. The uncut spectacle lens as claimed in claim 1, wherein at least a pair of tabs are fixed to the outer periphery of the lens body in spaced relationship with each other so that when a plurality of such lenses are laid one above another, the tabs of one of the adjoining lens bodies support the other lens body thereby preventing the adjoining lens bodies from coming into direct contact with each other.

5. The uncut spectacle lenses as claimed in claim 1, wherein said pair of tabs project from the outer periphery of the lens body by 2 mm or more both in length and width.

6. The uncut spectacle lenses as claimed in claim 1, wherein a line connecting the centers of said pair of tabs fixed to the lens body passes through the geometrical center of said lens.

7. An uncut spectacle lens comprising:
   a lens body; and
   a pair of tabs fixed to an outer periphery of the lens body in opposite relationship with each other with respect to a geometrical center of the lens,
   wherein the lens has an optical center at a position spaced apart from the geometrical center of the lens,
   wherein a connecting line connecting the geometrical center and the optical center of the lens makes a predetermined angle with respect to a central line passing through the pair of tabs and the geometrical center of the lens, and
   wherein said lens has a lens curve of 6 or more bases.

8. A pair of spectacles making use of the uncut spectacle lenses as claimed in any one of claims 1 through 7.

9. An uncut polarizing spectacle lens having a geometrical center and an optical center spaced apart from the geometrical center and a distance between the geometrical center and a parallel line drawn from the optical center of the lens in parallel relationship with an axis of polarization of the lens is in the order of 8.21 mm ±5 mm.

10. The uncut spectacle lenses as claimed in claim 9, wherein the optical center of said lens is spaced apart from the geometrical center thereof by 19 mm through 29 mm.

11. The uncut spectacle lenses as claimed in claim 9, wherein at least a pair of tabs are fixed to the outer periphery of each of the lens bodies of the spectacle lenses in spaced relationship with each other so that when the uncut spectacle lenses are laid one above the other, the adjoining lens bodies do not come into contact with each other with the tabs on one of the lens bodies supporting the outer periphery of the lens body of the other lens.

12. The uncut spectacle lenses as claimed in claim 11, wherein each of said pair of tabs projects from the outer periphery of the body of each of the spectacle lenses by 2 mm or more both in length and width.

13. The uncut spectacle lenses as claimed in claim 11, wherein a line connecting the centers of the pair of tabs passes through the geometrical center of each of said lenses.

14. The uncut spectacle lenses as claimed in claim 9, wherein each of said lenses has a lens curve having six or more bases.

15. A pair of spectacles making use of the uncut spectacle lenses as claimed in any one of claims 9 through 14.

16. Spectacle lenses wherein each of the lenses has a geometrical center and an optical center set at a position spaced apart from the geometrical center of the lens and when a user wears a pair of spectacles making use of said lenses, the optical center of each of said lenses lies closer to a nasal side extremity of the lens relative to the geometrical center thereof in the horizontal direction and is displaced upward with respect to the geometrical center, wherein a connecting line connecting the geometrical center and the optical center makes a predetermined angle in a range between 10 and 30 degrees with respect to an axis of polarization of the lens.

17. The spectacle lenses as claimed in claim 16, wherein each of the lenses has a lens curve of six or more bases.

18. A pair of spectacles making use of the spectacle lenses as claimed in claim 16 or 17.

19. A polarizing spectacle lens having a geometrical center and an optical center spaced apart from the former, and a connecting line connecting the geometrical center and the optical center that makes a predetermined angle in a range between 10 and 30 degrees with respect to an axis of polarization of the lens. polarization of the lens.

20. The spectacle lenses as claimed in claim 19, wherein the predetermined angle made by a connecting line connecting the optical center and the geometrical center of each of the spectacle lenses with respect to the axis of polarization of said lens is about 20 degrees.

21. The spectacle lenses as claimed in claim 19, wherein each of said lenses has a lens curve of six or more bases.

22. A pair of spectacles making use of the spectacle lenses as claimed in any one of claims 19 through 21.

* * * * *